United States Patent
Mashima et al.

(10) Patent No.: US 10,049,021 B2
(45) Date of Patent: *Aug. 14, 2018

(54) REDUNDANT SYSTEM AND REDUNDANCY METHOD

(71) Applicant: FUJITSU LIMITED, Kawasaki-shi, Kanagawa (JP)

(72) Inventors: Motoyuki Mashima, Sakai (JP); Tomoaki Mizoo, Kobe (JP); Toshirou Ono, Nishinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 378 days.

This patent is subject to a terminal disclaimer.

(21) Appl. No.: 14/721,479

(22) Filed: May 26, 2015

(65) Prior Publication Data
US 2015/0370648 A1     Dec. 24, 2015

(30) Foreign Application Priority Data
Jun. 20, 2014    (JP) ................. 2014-127732

(51) Int. Cl.
*G06F 7/00*     (2006.01)
*G06F 17/00*    (2006.01)
(Continued)

(52) U.S. Cl.
CPC ...... *G06F 11/1662* (2013.01); *G06F 11/2028* (2013.01); *G06F 11/2041* (2013.01); *G06F 11/2097* (2013.01)

(58) Field of Classification Search
CPC ............. G06F 11/2028; G06F 11/2041; G06F 11/2097; G06F 11/1662; G06F 17/30575
See application file for complete search history.

(56) References Cited

U.S. PATENT DOCUMENTS

| | | | | |
|---|---|---|---|---|
| 6,363,021 B2 * | 3/2002 | Noh | ....................... | G11C 29/24 365/200 |
| 6,813,687 B1 * | 11/2004 | Humlicek | ........... | G06F 11/1076 711/114 |

(Continued)

FOREIGN PATENT DOCUMENTS

| | | |
|---|---|---|
| JP | 2003-122509 | 4/2003 |
| JP | 2005-267216 | 9/2005 |

(Continued)

OTHER PUBLICATIONS

Japanese Office Action dated Mar. 20, 2018 for corresponding Japanese Patent Application No. 2014-127732, with English Translation, 7 pages.

(Continued)

*Primary Examiner* — Hasanul Mobin
(74) *Attorney, Agent, or Firm* — Fujitsu Patent Center

(57) ABSTRACT

A redundant system includes a primary system including a first node and a second node, and a secondary system including a third node and a fourth node. When the secondary system in place of the primary system operates, the fourth node executes first takeover processing or second takeover processing, the first takeover processing taking over the primary system on the basis of data update information acquired from either a second inter-system transfer path or a second intra-system transfer path, and the second takeover processing taking over the primary system on the basis of both the data update information acquired from the second inter-system transfer path and the data update information acquired from the second intra-system transfer path.

6 Claims, 14 Drawing Sheets

(51) Int. Cl.
*G06F 11/16* (2006.01)
*G06F 11/20* (2006.01)

(56) References Cited

U.S. PATENT DOCUMENTS

| | | | |
|---|---|---|---|
| 7,739,540 B2 | 6/2010 | Akutsu et al. | |
| 7,925,914 B2 | 4/2011 | Akutsu et al. | |
| 8,281,179 B2 | 10/2012 | Akutsu et al. | |
| 8,312,236 B2 | 11/2012 | Benhase et al. | |
| 9,002,800 B1* | 4/2015 | Yueh | G06F 12/145 707/640 |
| 9,483,362 B2* | 11/2016 | Gokhale | G06F 11/1464 |
| 2003/0005350 A1* | 1/2003 | Koning | H04L 67/1002 714/4.11 |
| 2003/0021223 A1* | 1/2003 | Kashyap | H04L 12/56 370/217 |
| 2003/0051111 A1 | 3/2003 | Nakano et al. | |
| 2003/0177149 A1* | 9/2003 | Coombs | G06F 11/1469 |
| 2004/0193945 A1* | 9/2004 | Eguchi | G06F 11/142 714/6.1 |
| 2004/0250034 A1 | 12/2004 | Yagawa et al. | |
| 2004/0260736 A1* | 12/2004 | Kern | G06F 11/2058 |
| 2005/0210078 A1 | 9/2005 | Maruyama et al. | |
| 2006/0277378 A1* | 12/2006 | Morishita | G06F 3/061 711/162 |
| 2007/0067593 A1* | 3/2007 | Satoyama | G06F 3/0613 711/165 |
| 2008/0104346 A1 | 5/2008 | Watanabe et al. | |
| 2010/0036896 A1 | 2/2010 | Nakagawa et al. | |
| 2012/0278571 A1* | 11/2012 | Fleming | G06F 9/455 711/162 |
| 2013/0219137 A1* | 8/2013 | Ong | G06F 12/16 711/162 |
| 2013/0246367 A1* | 9/2013 | Clayton | G06F 11/2071 707/655 |
| 2015/0269042 A1* | 9/2015 | Jain | G06F 11/1658 714/6.3 |
| 2016/0004616 A1* | 1/2016 | Narita | G06F 12/00 714/6.3 |

FOREIGN PATENT DOCUMENTS

| | | |
|---|---|---|
| JP | 2008-134986 | 6/2008 |
| JP | 2008-134988 | 6/2008 |

OTHER PUBLICATIONS

U.S. Notice of Allowance and Fee(s) Due dated Mar. 15, 2018 for co-pending U.S. Appl. No. 14/721,137, 5 pages.
U.S. Office Action dated Jan. 11, 2017 for co-pending U.S. Appl. No. 14/712,137, 12 pages.
U.S. Office Action dated May 10, 2017 for co-pending U.S. Appl. No. 14/721,137, 13 pages.
U.S. Office Action dated Nov. 22, 2017 for co-pending U.S. Appl. No. 14/721,137, 17 pages.
Japanese Office Action dated Oct. 3, 2017 for corresponding Japanese Patent Application No. 2014-127732, with English Translation, 10 pages.

* cited by examiner

REDUNDANT SYSTEM AND REDUNDANCY METHOD

CROSS-REFERENCE TO RELATED APPLICATION

This application is based upon and claims the benefit of priority of the prior Japanese Patent Application No. 2014-127732, filed on Jun. 20, 2014, the entire contents of which are incorporated herein by reference.

FIELD

The embodiments discussed herein are directed to a redundant system and a redundancy method.

BACKGROUND

A variety of nodes including a Web server, an application server and a DB (DataBase) server are set up in a data center where each of these nodes is usually made redundant to be prepared for an accident or a failure.

There is known a redundancy technique, for example, in which a primary node and a secondary node are provided as nodes in the data center so that, when the primary node fails, the secondary node instead takes over processing of the failed primary node and continues the processing.

There is also known a technique in which a secondary data center provided as a backup of a primary data center takes over processing executed in the primary data center and continues the processing, when the primary data center is damaged.

Patent Literature 1: Japanese Laid-open Patent Publication No. 2008-134986

When the secondary data center takes over the processing as a substitution for the primary data center, a data lost incidental to the switchover of the data center needs to be prevented. The switchover to the secondary data center is needed for different reasons at different times and, in a mode where switchover control is executed in the same way regardless of the reason for the switchover, more data lost may possibly occur.

SUMMARY

According to an aspect of the embodiments, a redundant system includes: a primary system including: a first node; and a second node that acquires data update information generated according to a data update performed in the first node through a first intra-system transfer path; and a secondary system including: a third node that acquires data update information generated according to a data update performed in the first node through a first inter-system transfer path set between the first node and the third node; and a fourth node that acquires the data update information acquired by the second node through a second inter-system transfer path set between the second node and the fourth node, and acquire the data update information acquired by the third node through a second intra-system transfer path. The fourth node includes: a processor that executes a process including: when the secondary system in place of the primary system operates, executing first takeover processing or second takeover processing, the first takeover processing taking over the primary system on the basis of the data update information acquired from either the second inter-system transfer path or the second intra-system transfer path, and the second takeover processing taking over the primary system on the basis of both the data update information acquired from the second inter-system transfer path and the data update information acquired from the second intra-system transfer path.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Note that the present invention is not to be limited by these embodiments.

[a] First Embodiment

Example of Overall Configuration

Figure 1:
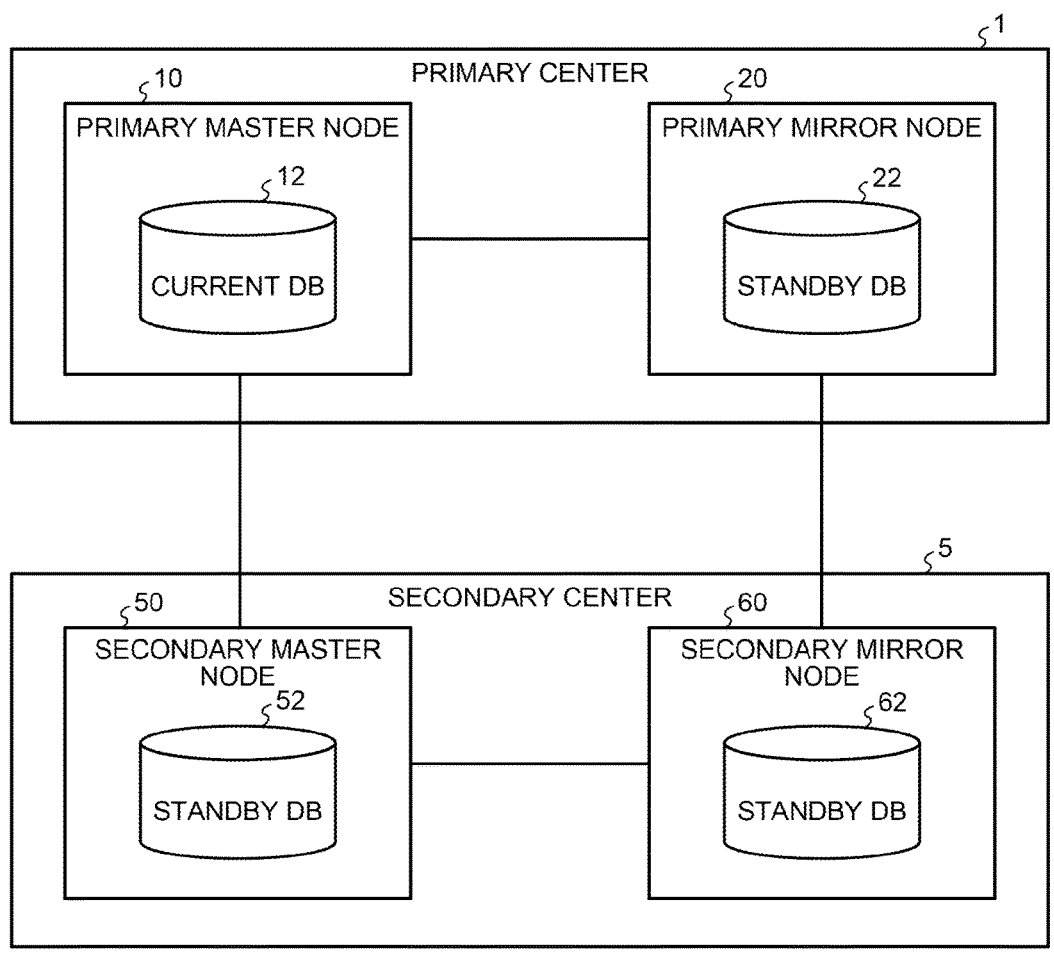
FIG. 1 is a diagram illustrating an example of an overall configuration of a redundancy system according to a first embodiment.

FIG. 1 is a diagram illustrating an example of an overall configuration of a redundancy system according to a first embodiment. As illustrated in FIG. 1, this system is a redundancy system in which a data center is mirrored by realizing a DB quadruplication function, i.e., a DB quad-redundancy function, the system including a primary center 1 and a secondary center 5 each being a data center.

The primary center 1 is a data center including a primary master node 10 and a primary mirror node 20, and has a redundant configuration in which a DB is mirrored. Likewise, the secondary center 5 is a data center including a secondary master node 50 and a secondary mirror node 60, and has a redundant configuration in which a DB is mirrored. The secondary center 5 functions as a backup of the primary center 1. Note that each node is an example of a DB server, a storage system and the like.

The primary master node 10 is an example of a first node having a current DB 12 updated by an operation, and is started up as a primary node in normal operation. The primary master node 10 updates the current DB 12 by using a business application or the like and extracts update information indicating a difference before and after the update. The primary master node 10 transmits, to the primary mirror node 20, an update log indicating the updated content in synchronization with the update of the current DB 12, for example. Moreover, the primary master node 10 generates an update file formed of a plurality of update logs and transmits the file to the secondary master node 50 at a predetermined interval.

The primary mirror node 20 is an example of a second node having a standby DB 22 updated in synchronization with the current DB 12, and functions as a backup of the primary master node 10 in normal operation. The primary mirror node 20 receives, through a first intra-system transfer path, the update log that is the update information generated in accordance with a data update in the primary master node 10. The primary mirror node 20 then uses the update log received and updates the standby DB 22. The primary mirror node 20 thereafter generates an update file formed of the update log received from the primary master node 10 and transmits the file to the secondary mirror node 60 at a predetermined interval.

The secondary master node 50 is an example of a third node having a standby DB 52 which stores information equivalent to that stored in the current DB 12, and functions as a master node of a secondary system in normal operation as a measure to deal with an accident or the like in the primary center 1. A first inter-system transfer path is set between the secondary master node 50 and the primary master node 10 so that the secondary master node acquires, through the first inter-system transfer path, a piece of update information generated in accordance with the data update in the primary master node 10.

Upon receiving the update file as the update information from the primary master node 10, for example, the secondary master node 50 extracts an update log from the update file received and uses each update log extracted to update the standby DB 52. The secondary master node 50 thereafter generates an update file formed of a plurality of update logs received from the primary master node 10 and transmits the file to the secondary mirror node 60 at a predetermined interval.

The secondary mirror node 60 is an example of a fourth node having a standby DB 62 which stores information equivalent to that stored in the current DB 12, and functions as a mirror node of the secondary system in normal operation as a measure to deal with an accident or the like in the primary center 1. A second inter-system transfer path is set between the secondary mirror node 60 and the primary mirror node 20 so that the secondary mirror node acquires, through the second inter-system transfer path, a piece of update information of the data acquired by the primary mirror node 20. The secondary mirror node 60 further acquires, through a second intra-system transfer path, a piece of update information of the data acquired by the secondary master node 50.

The secondary mirror node 60 receives the update file as the update information from the primary mirror node 20 and receives the update log from the secondary master node 50, for example. The secondary mirror node 60 then uses any of the update information received and updates the standby DB 62.

When the secondary center 5 is operated as a substitution for the primary center 1 in the aforementioned state, the secondary mirror node 60 can execute both first takeover processing and second takeover processing, the first takeover processing taking over the primary center 1 on the basis of data update information acquired from either the second inter-system transfer path or the second intra-system transfer path, and the second takeover processing taking over the primary center 1 on the basis of both the data update information acquired from the second inter-system transfer path and the data update information acquired from the second intra-system transfer path.

That is, the secondary mirror node 60 in the DB quadruplication system receives the update information of the current DB 12 from the primary master node 10 from two systems, the primary mirror node 20 and the secondary master node 50. When the primary system is under maintenance, the secondary mirror node 60 uses an arbitrary piece of update information between the update information received from the two systems to update the standby DB 62 and then executes system switchover. When the primary system is down, on the other hand, the secondary mirror node 60 uses the latest of the update information received from the two systems to update the standby DB 62 and then executes the system switchover.

As a result, at the time of the system switchover, the switchover can be executed while preventing the data lost.

Functional Configuration of Each Node

Next, a functional configuration of each node illustrated in FIG. 1 will be described. Here, while the functional configuration in a state illustrated in FIG. 1 will be described as an example, each node can also have the same functional configuration.

Functional Configuration of Primary Center

Figure 2:
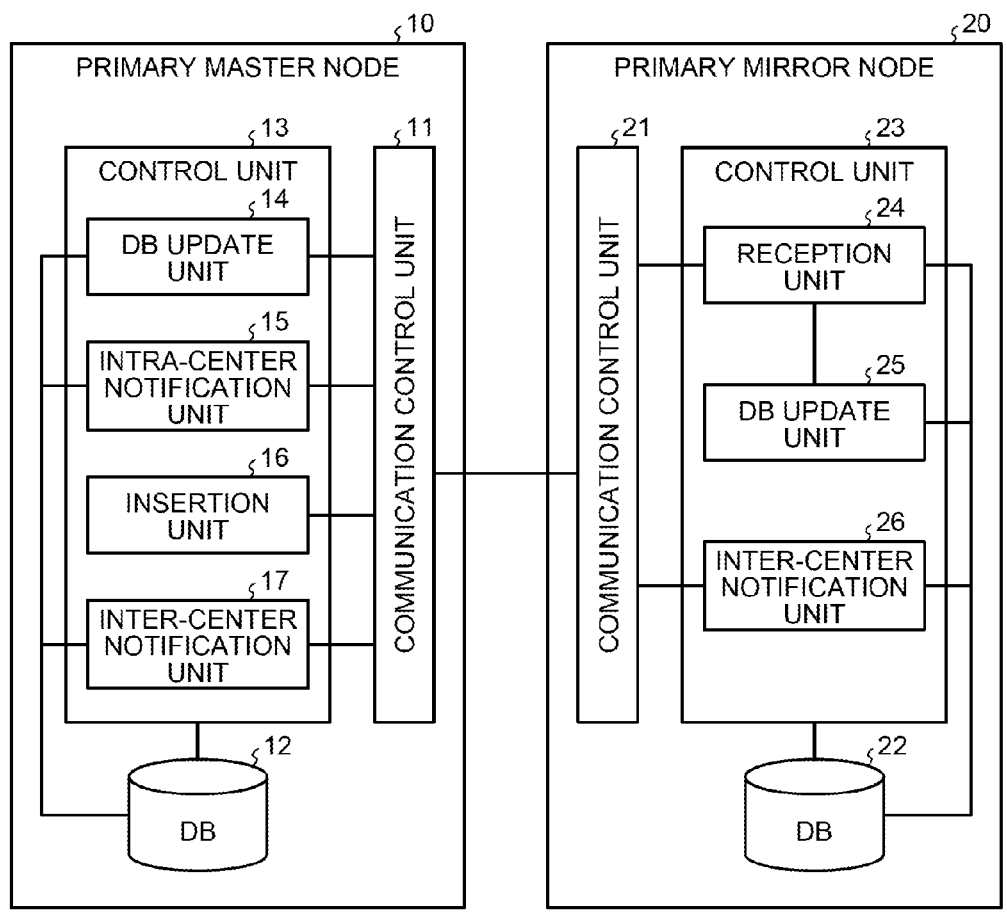
FIG. 2 is a functional block diagram illustrating a functional configuration of each node in a primary center.

FIG. 2 is a functional block diagram illustrating a functional configuration of each node in the primary center. The primary master node 10 and the primary mirror node 20 included in the primary center 1 will be described below.

Functional Configuration of Primary Master Node

As illustrated in FIG. 2, the primary master node 10 includes a communication control unit 11, a DB 12, and a control unit 13.

The communication control unit 11 is a processor that controls communication between the primary master node and each of the primary mirror node 20 and the secondary master node 50, and is a network interface, for example. The communication control unit 11 constructs the first intra-system transfer path communicating with the primary mirror node 20 and the first inter-system transfer path communicating with the secondary master node 50, for example.

The DB 12 is a database storing operation information or the like and corresponds to the current DB 12 illustrated in FIG. 1. The DB 12 is updated by an operation. The DB 12 is provided in a storage such as a hard disk. The DB 12 corresponds to the active DB 12.

The control unit 13 is an example of a processor that controls processing of the entire primary master node 10. The control unit 13 executes a function that realizes a DB redundancy system of the primary master node 10 and the primary mirror node 20 as well as a function that realizes a DB redundancy system of the primary master node 10 and the secondary master node 50.

That is, the control unit 13 executes an application realizing a DB duplication function within the primary center 1 and an application realizing the DB quadruplication function across the centers. When performing maintenance of the node, the control unit 13 shifts to a maintenance mode or the like after transmitting all the update information already updated in the DB 12 to both the primary mirror node 20 and the secondary master node 50. Note that the control unit 13 can also notify each node about the shift to the maintenance mode through the same path as the path through which the update information is transmitted.

The control unit 13 includes a DB update unit 14, an intra-center notification unit 15, an insertion unit 16, and an inter-center notification unit 17. Each of these processing units is an example of an electronic circuit included in the processor or processing executed by the processor.

The DB update unit 14 is a processing unit that updates the DB 12. The DB update unit 14 updates data stored in the DB 12 with the execution of an application, for example.

The intra-center notification unit 15 is a processing unit that transmits update information of the DB 12 to the primary mirror node 20 within the same system in synchronization with the update of the DB 12. Specifically, the intra-center notification unit 15 extracts a difference in information before and after the update once the DB 12 is updated. The intra-center notification unit 15 then uses the first intra-system transfer path and transmits, to the primary mirror node 20, an update log indicating difference information as the update information.

Figure 3:
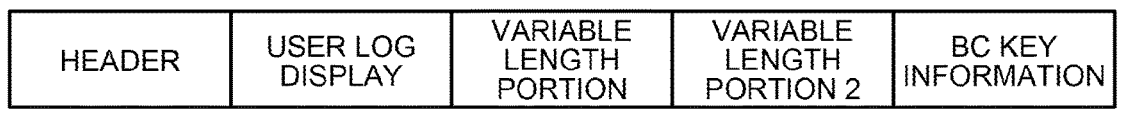
FIG. 3 is a diagram illustrating an example of a user log.
Figure 4:
FIG. 4 is a diagram illustrating an example of a control log.

An example of the update log will be described below. FIG. 3 is a diagram illustrating an example of a user log, while FIG. 4 is a diagram illustrating an example of a control log. As illustrated in FIG. 3, the user log being an example of the update log indicates the update information of the DB and is formed of "header, user log display, variable length portion, variable length portion 2, and BC key information".

Information indicating the update log as well as a date and time created are set to the "header", while information indicating that it is the user log is set to the "user log display". Set to the "variable length portion" and the "variable length portion 2" is a piece of information indicating the content of update of the DB such as a specific record location, data before and after the update, and the difference information. Information on the DB duplication between the primary master node 10 and the primary mirror node 20 such as checksum information and a serial number of the log are set to the "BC key information".

As illustrated in FIG. 4, the control log being an example of the update log indicates control processing such as rollback processing performed on the DB and is formed of "header, control log display, and COMMIT specification". Information indicating the update log as well as a date and time created are set to the "header", while information indicating that it is the control log is set to the "control log display". Information indicating specific control processing such as transaction information is set to the "COMMIT specification".

When the DB 12 is updated, the intra-center notification unit 15 generates the update log such as the user log or the control log by using the updated information, as described above. The intra-center notification unit 15 then transmits the generated update log to the primary mirror node 20. The intra-center notification unit 15 further notifies the inter-center notification unit 17 of the generated update log. That is, the intra-center notification unit 15 notifies of the update information of the DB in synchronization with the update of the DB 12 within the same center.

When the update information generated in accordance with the update of data in the DB of the primary master node 10 is transmitted to the primary mirror node 20 and the secondary master node 50, the insertion unit 16 inserts delimitation information, indicating the boundary of one or a plurality of update processing units, to the data transmitted to the primary mirror node and the secondary master node.

Specifically, the insertion unit 16 periodically generates a check point which is a piece of determination information common to each node and determines an arrival state of the update log. The insertion unit 16 then transmits the periodically generated check point to the primary mirror node 20 and notifies the inter-center notification unit 17. Note that the check point in this case adopts a recovery point log that is an example of the update log. Moreover, the time interval at which the check point is generated can be set to five seconds, for example, but may be changed as appropriate.

Figure 5:
FIG. 5 is a diagram illustrating an example of a recovery point log.

FIG. 5 is a diagram illustrating an example of the recovery point log. As illustrated in FIG. 5, the recovery point log is a log indicating the check point which determines the arrival state of the update log and is formed of "header, control log display, and RP information". Information indicating the update log as well as a date and time created are set to the "header", while information indicating that it is the recovery point log is set to the "control log display". The "RP information" is a piece of information identifying the recovery point and includes an "identifier" and a "serial number". The "identifier" is a piece of information identifying that it is the check point information of the DB quadruplication function, while the "serial number" is a 23-byte fixed positive number that is unique in the DB quadruplication system, where a larger number indicates a newer log, for example.

The inter-center notification unit 17 is a processing unit that puts together the update information of the DB 12 to be periodically transmitted to the secondary master node 50 in a different system. Specifically, the inter-center notification unit 17 generates an update file in which the update log acquired from the intra-center notification unit 15 and the recovery point log acquired from the insertion unit 16 are put together in chronological order at an interval of 10 seconds, for example. The inter-center notification unit 17 then uses the first inter-system transfer path and transmits the update file to the secondary master node 50. That is, the inter-center notification unit 17 generates the update information and performs the notification asynchronously with the update of the DB 12 across different centers, the update information including the update information of the DB and the check point that are periodically put together.

Figure 6:
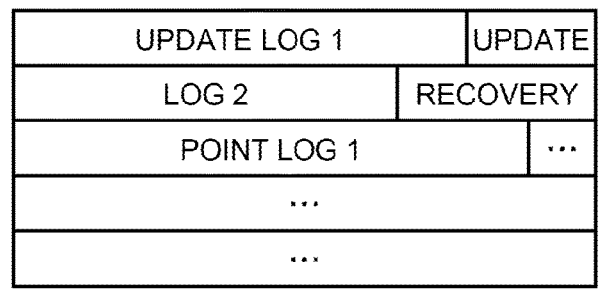
FIG. 6 is a diagram illustrating an example of an update file transmitted in inter-system communication.

FIG. 6 is a diagram illustrating an example of the update file transmitted in inter-system communication. As illustrated in FIG. 6, the update file is formed of the update log and the recovery point log. FIG. 6 illustrates the example where an update log 1, an update log 2, and a recovery point log 1 included in the update file are generated in this order. Note that the update log 1 and update log 2 correspond to the aforementioned user log and control log, while the recovery point log 1 corresponds to the aforementioned recovery point log.

Functional Configuration of Primary Mirror Node

As illustrated in FIG. 2, the primary mirror node 20 includes a communication control unit 21, a DB 22, and a control unit 23.

The communication control unit 21 is a processor that controls communication between the primary mirror node and each of the primary master node 10 and the secondary mirror node 60, and is a network interface, for example. The communication control unit 21 constructs the first intra-system transfer path communicating with the primary master node 10 and the second inter-system transfer path communicating with the secondary mirror node 60, for example.

The DB 22 is a database storing operation information or the like similar to that stored in the DB 12 of the primary master node 10, and corresponds to the standby DB 22 illustrated in FIG. 1. The DB 22 is updated in synchronization with the DB 12. Note that the DB 22 is provided in a storage such as a hard disk. The DB 22 corresponds to the standby DB 22.

The control unit 23 is an example of a processor that controls processing of the entire primary mirror node 20. The control unit 23 executes a function that realizes the DB redundancy system of the primary master node 10 and the primary mirror node 20 as well as a function that realizes a DB redundancy system of the primary mirror node 20 and the secondary mirror node 60. That is, the control unit 23 executes an application realizing the DB duplication function within the primary center 1 and an application realizing the DB quadruplication function across the centers.

Note that, when performing maintenance of the node, the control unit 23 shifts to a maintenance mode or the like after transmitting all the update information received from the primary master node 10 to the secondary mirror node 60. The control unit 23 can also notify each node about the shift to the maintenance mode through the same path as the path through which the update information is transmitted.

The control unit 23 includes a reception unit 24, a DB update unit 25, and an inter-center notification unit 26. Each of these processing units is an example of an electronic circuit included in the processor or processing executed by the processor.

The reception unit 24 is a processing unit that receives the update information of the DB 12 from the primary master node 10. Specifically, the reception unit 24 uses the first intra-system transfer path to receive an update log in synchronization with the update of the DB 12 in the primary master node 10 and notifies the DB update unit 25 and the inter-center notification unit 26. The reception unit 24 also notifies the inter-center notification unit 26 upon receiving the recovery point log.

The DB update unit 25 is a processing unit that uses the update information of data notified by the primary master node 10 and updates the DB 22. The DB update unit 25 extracts a record to be updated or updated data from the variable length portion of the update log received and then updates the DB 22 according to the extracted information, for example. The DB update unit 25 updates the DB 22 every time the update log is received. As a result, the DB 22 can be synchronized with the DB 12 of the primary master node 10 and function as a mirroring DB.

The inter-center notification unit 26 is a processing unit that puts together the update information of the DB 22 to be periodically transmitted to the secondary mirror node 60 in a different system. Specifically, the inter-center notification unit 26 generates an update file in which the update log and recovery point log received from the primary master node 10 are put together in chronological order at an interval of 10 seconds, for example. The inter-center notification unit 26 then uses the second inter-system transfer path to transmit the update file to the secondary mirror node 60. The inter-center notification unit 26 generates the update file illustrated in FIG. 6 and transmits the file to the secondary mirror node 60, for example.

Functional Configuration of Secondary Center

Figure 7:
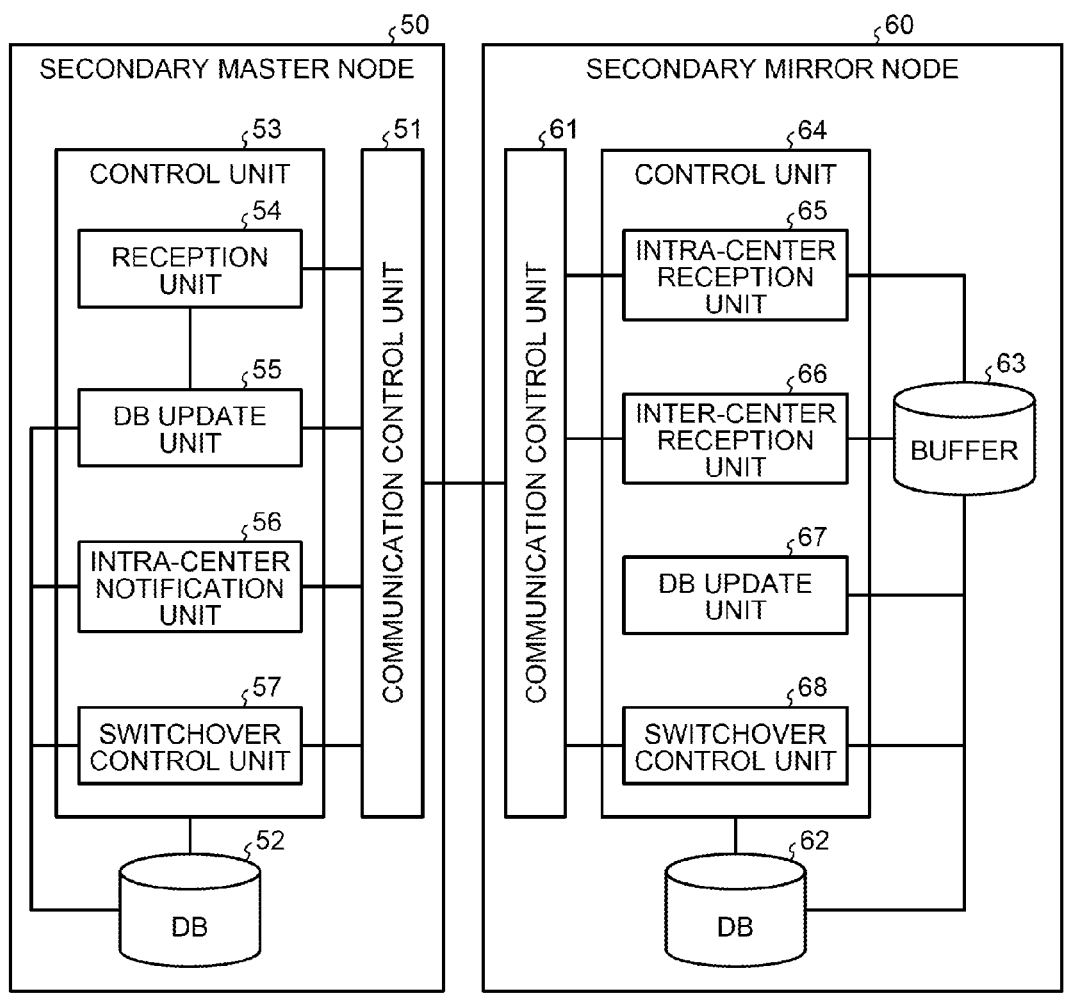
FIG. 7 is a functional block diagram illustrating a functional configuration of each node in a secondary center.

FIG. 7 is a functional block diagram illustrating a functional configuration of each node in the secondary center. The secondary master node 50 and the secondary mirror node 60 included in the secondary center 5 will be described below.

Functional Configuration of Secondary Master Node

As illustrated in FIG. 7, the secondary master node 50 includes a communication control unit 51, a DB 52, and a control unit 53.

The communication control unit 51 is a processor that controls communication between the secondary master node and each of the primary master node 10 and the secondary mirror node 60, and is a network interface, for example. The communication control unit 51 constructs the first inter-system transfer path communicating with the primary master node 10 and the second intra-system transfer path communicating with the secondary mirror node 60, for example.

The DB 52 is a database storing operation information or the like and corresponds to the standby DB 52 illustrated in FIG. 1. The DB 52 is updated asynchronously with the update of the DB 12 by the update information notified from the primary master node 10. Note that the DB 52 is provided in a storage such as a hard disk. The DB 52 corresponds to the standby DB 52.

The control unit 53 is an example of a processor that controls processing of the entire secondary master node 50. The control unit 53 executes an application realizing the entire DB quadruplication system across the centers illustrated in FIG. 1 and an application realizing the DB duplication function within the secondary center 5.

The control unit 53 includes a reception unit 54, a DB update unit 55, an intra-center notification unit 56, and a switchover control unit 57. Each of these processing units is an example of an electronic circuit included in the processor or processing executed by the processor.

The reception unit 54 is a processing unit that receives the update information of the DB 12 from the primary master node 10. Specifically, the reception unit 54 uses the first inter-system transfer path to receive the update file formed of the update log at a predetermined interval. The reception unit 54 then outputs the received update file to the DB update unit 55.

The DB update unit 55 is a processing unit that updates the DB 52 according to the update information of data notified by the primary master node 10. The DB update unit 55 extracts various logs included in the update file that is received by the reception unit 54, for example.

The DB update unit 55 then identifies the user log and control log from among the extracted logs. After that, the DB update unit 55 reflects the data update identified by the user log or the control log to the DB 52 in the chronological order the logs are generated. The DB update unit 55 further outputs, to the intra-center notification unit 56, each of the various logs extracted from the update file in the chronological order.

Upon receiving the update file illustrated in FIG. 6, for example, the DB update unit 55 extracts the update log 1, the update log 2, and the recovery point log 1 from the update file. The DB update unit 55 first reflects the data update identified by the update log 1 into the DB 52 and then reflects the data update identified by the update log 2 into the DB 52. On the other hand, the DB update unit 55 outputs the extracted update log 1, update log 2, and recovery point log 1 to the intra-center notification unit 56.

The intra-center notification unit 56 is a processing unit that transmits the update information of the data reflected in the DB 52 to the secondary mirror node 60. Specifically, the intra-center notification unit 56 uses the second intra-system transfer path and transmits, to the secondary mirror node 60, the update log and the recovery point log received from the primary master node 10 in the chronological order each log is generated.

In the aforementioned example, the intra-center notification unit 56 receives the update log 1, the update log 2, and the recovery point log 1 in this order from the DB update unit 55. Then, the intra-center notification unit 56 transmits to the secondary mirror node 60 the update log 1 first, followed by the update log 2 and lastly the recovery point log 1.

The switchover control unit 57 is a processing unit that executes system switchover or the like according to shutdown information of a node received from a manager terminal or another node that is not illustrated. When the primary center 1 is shut down due to maintenance, for example, the switchover control unit 57 promotes the secondary master node to a primary master node after receiving all the update information from the primary master node 10 and reflecting the information to the DB 52. That is, the switchover control unit 57 notifies the DB update unit 55 about the promotion to the master node, while the DB update unit 55 updates the DB 52 by executing a business application or the like.

Moreover, when receiving an instruction to be demoted to a mirror node from the secondary mirror node 60 following the system down of the primary center 1, the switchover control unit 57 demotes the secondary master node to a primary mirror node. That is, the switchover control unit 57 instructs the intra-center notification unit 56 to stop transmission processing performed through the second intra-system transfer path, and instructs the DB update unit 55 to start update processing as a secondary mirror node. As a result, the DB update unit 55 receives the update information from the secondary mirror node 60 and updates the DB 52.

Functional Configuration of Secondary Mirror Node

As illustrated in FIG. 7, the secondary mirror node 60 includes a communication control unit 61, a DB 62, a buffer 63, and a control unit 64.

The communication control unit 61 is a processor that controls communication between the secondary mirror node and each of the primary mirror node 20 and the secondary master node 50, and is a network interface, for example. The communication control unit 61 constructs the second inter-system transfer path communicating with the primary mirror node 20 and the second intra-system transfer path communicating with the secondary master node 50, for example.

The DB 62 is a database storing operation information or the like and corresponds to the standby DB 62 illustrated in FIG. 1. The DB 62 is updated by the update information notified from the primary master node 10, asynchronously with the update of the DB 12 in the primary master node 10. On the other hand, the DB 62 is updated in synchronization with the update of the DB 52 in the secondary master node 50. Note that the DB 62 is provided in a storage such as a hard disk. The DB 62 corresponds to the standby DB 62.

The buffer 63 is a storage area temporarily storing the update information received from the primary mirror node 20 by using the second inter-system transfer path and the update information received from the secondary master node 50 by using the second intra-system transfer path. Note that the buffer 63 is provided in a storage such as a hard disk or a memory.

The control unit 64 is an example of a processor that controls processing of the entire secondary mirror node 60. The control unit 64 executes an application realizing the entire DB quadruplication system across the centers illustrated in FIG. 1 and an application realizing the DB duplication function within the secondary center 5.

The control unit 64 includes an intra-center reception unit 65, an inter-center reception unit 66, a DB update unit 67, and a switchover control unit 68. Each of these processing units is an example of an electronic circuit included in the processor or processing executed by the processor.

The intra-center reception unit 65 is a processing unit that receives the update information of data from the secondary master node 50. Specifically, the intra-center reception unit 65 uses the second intra-system transfer path to receive the update log and the recovery point log from the secondary master node 50 and stores the logs into the buffer 63 in the chronological order of the date and time each log is generated. In the aforementioned example, the intra-center reception unit 65 receives the update log 1, the update log 2, and the recovery point log 1 in this order from the secondary master node 50 and stores the logs into the buffer 63 in the order the logs are received.

The inter-center reception unit 66 is a processing unit that receives the update information of data from the primary mirror node 20. Specifically, the inter-center reception unit 66 uses the second inter-system transfer path to receive the update file formed of the update log and the recovery point log from the primary mirror node 20. The inter-center reception unit 66 then extracts the various logs from the update file and stores the logs into the buffer 63 in the order of the data and time each log is generated.

The DB update unit 67 is a processing unit that uses the update information received and updates the DB 62. Specifically, the DB update unit 67 reads from the buffer 63 the update log received by the intra-center reception unit 65 in the order each update log is generated, and successively updates the DB 62 according to the update log being read.

Moreover, the DB update unit 67 selects and executes DB update processing in the system switchover by an instruction from the switchover control unit 68 to be described later. When notified from the switchover control unit 68 that the maintenance of the primary center 1 is started, for example, the DB update unit 67 updates the DB 62 by using either the update information received by the intra-center reception unit 65 or the update information received by the inter-center reception unit 66. After that, the DB update unit 67 executes the system switchover by which the secondary mirror node is operated as a mirror node in the primary system. That is, the DB update unit 67 updates the DB 62 by using the update information received by the intra-center reception unit 65 after the system switchover is started.

When notified of the system down of the primary center 1 from the switchover control unit 68, on the other hand, the DB update unit 67 selects the latest update information between the update information received by the intra-center reception unit 65 and the update information received by the inter-center reception unit 66, and reflects the information to the DB 62. The DB update unit 67 determines which update information is the latest on the basis of the serial number or the like within the recovery point log, for example.

When the update information received by the intra-center reception unit 65 is determined to be the latest, the DB update unit 67 executes the system switchover by which the secondary mirror node is operated as a mirror node in the primary system. That is, the DB update unit 67 updates the DB 62 by using the update information received by the intra-center reception unit 65 after the system switchover is started.

When the update information received by the inter-center reception unit 66 is determined to be the latest, on the other hand, the DB update unit 67 executes the system switchover by which the secondary mirror node is operated as a master node in the primary system. That is, the DB update unit 67 transmits a demotion instruction to the secondary master node 50 to be operated as a mirror node in the primary system. The DB update unit 67 further updates the DB 62 by executing a business application or the like and transmits the update information of the DB 62 to the secondary master node 50 by using the second intra-system transfer path.

The switchover control unit 68 is a processing unit that executes the system switchover or the like according to shutdown information of a node received from a manager terminal or another node that is not illustrated. When the primary center 1 is shut down due to maintenance, for example, the switchover control unit 68 notifies the DB update unit 67 that the maintenance of the primary center 1 is started. When the primary center 1 experiences the system down, the switchover control unit 68 notifies the DB update unit 67 about the system down of the primary center 1.

Flow of Processing Related to DB Update

Now, DB update processing and update information notification processing executed by each node will be described. Note that while there will be described an example where the check point (recovery point log) is generated after updating the DB, it is not limited to such example. The processing of updating the DB and the processing of generating the check point can be executed concurrently or in separate flowcharts, for example.

Notification Processing from Primary Master Node 10 to Primary Mirror Node 20

Figure 8:
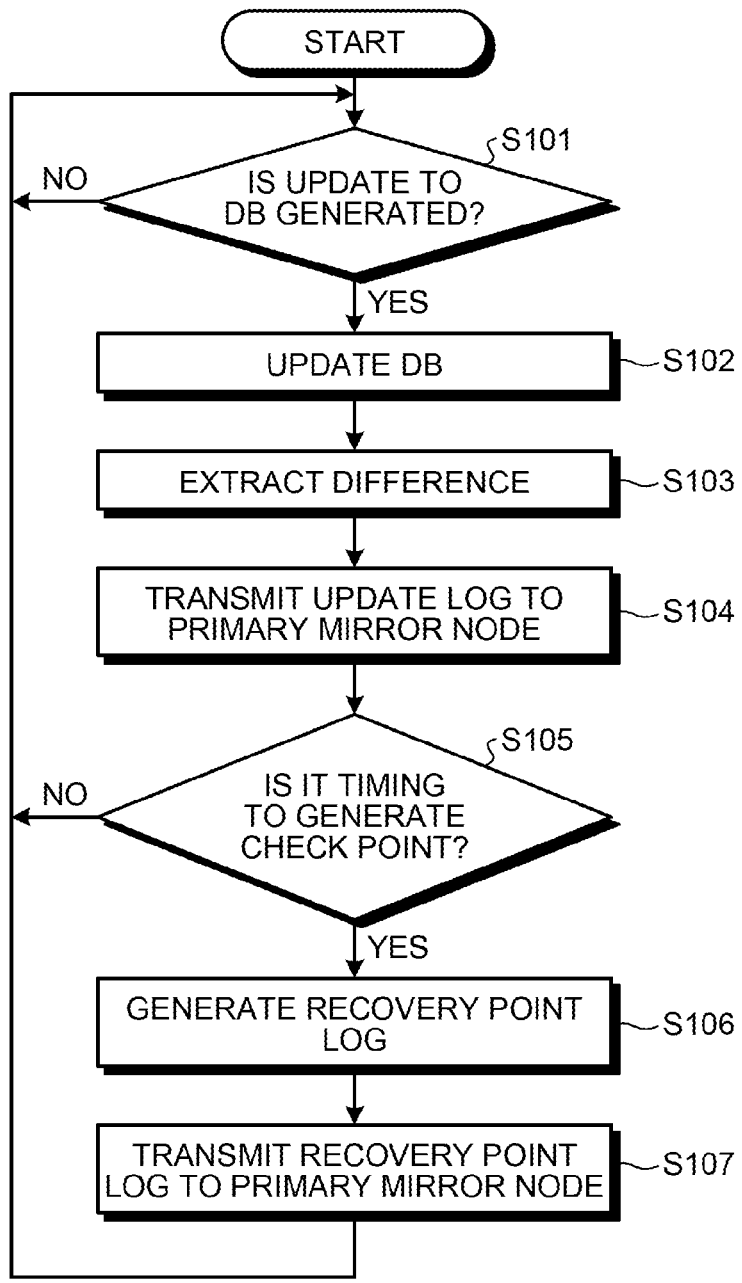
FIG. 8 is a flowchart illustrating the flowof notification processing performed from a primary master node to a primary mirror node.

FIG. 8 is a flowchart illustrating the flow of notification processing performed from the primary master node to the primary mirror node.

As illustrated in FIG. 8, the DB update unit 14 of the primary master node 10 updates the DB 12 (Step S102) once an update to the DB 12 is generated (Step S101: Yes). Next, the intra-center notification unit 15 extracts a difference in the updated DB 12 before and after the update (Step S103), and generates the update log and transmits it to the primary mirror node 20 (Step S104).

On the other hand, at a timing to generate the check point (Step S105: Yes), the insertion unit 16 generates the recovery point log containing the serial number of the check point (Step S106) and transmits the log to the primary mirror node 20 (Step S107). Note that the processing returns to Step S101 when it is not the timing to generate the check point (Step S105: No), in which case the processing from Step S101 onward is executed.

Notification Processing from Primary Master Node 10 to Secondary Master Node 50

Figure 9:
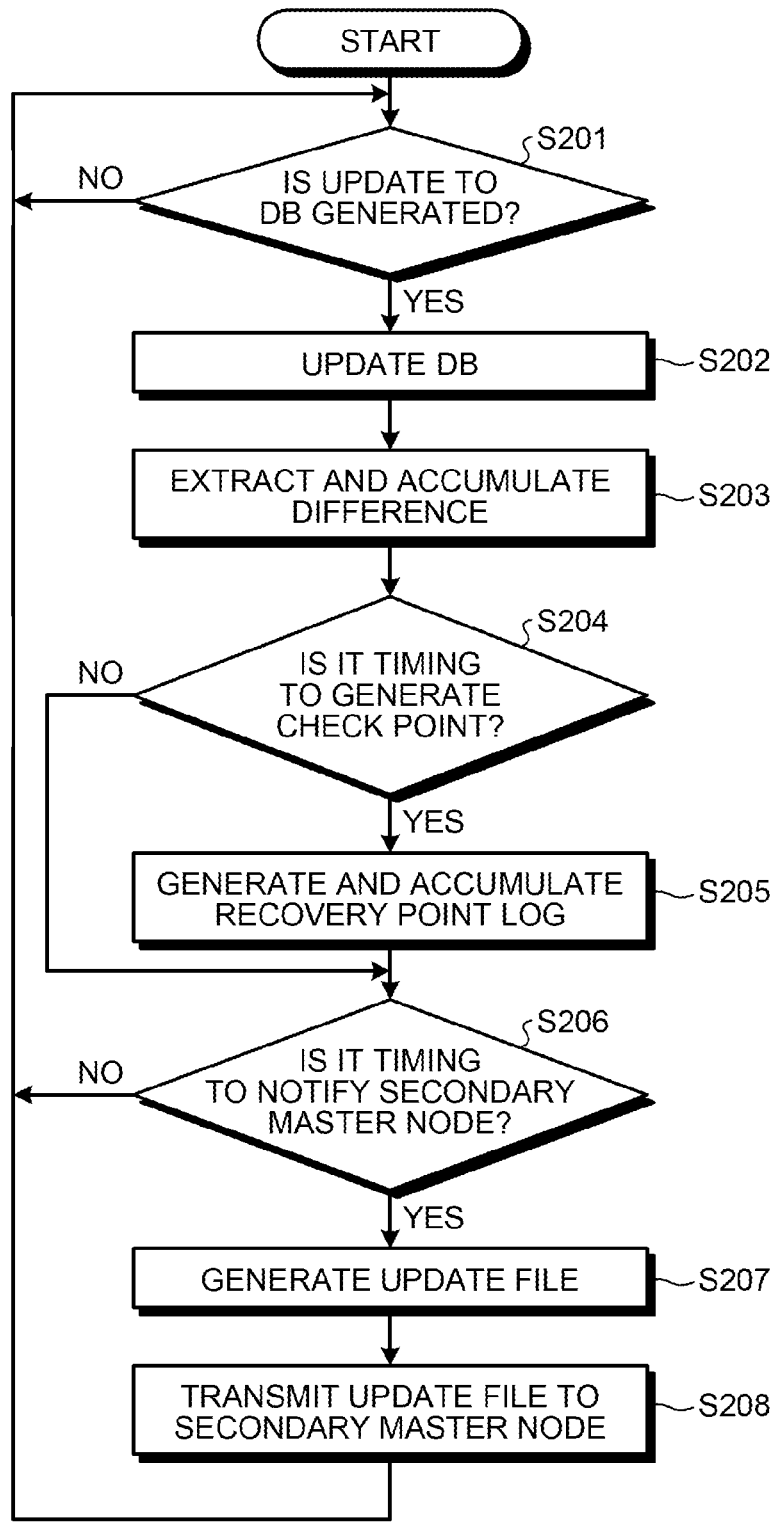
FIG. 9 is a flowchart illustrating the flow of notification processing performed from the primary master node to a secondary master node.

FIG. 9 is a flowchart illustrating the flow of notification processing performed from the primary master node to the secondary master node.

As illustrated in FIG. 9, the DB update unit 14 of the primary master node 10 updates the DB 12 (Step S202) once an update to the DB 12 is generated (Step S201: Yes). The inter-center notification unit 17 thereafter extracts and accumulates a difference in the updated DB 12 before and after the update (Step S203).

On the other hand, at a timing to generate the check point (Step S204: Yes), the insertion unit 16 generates and accumulates the recovery point log containing the serial number of the check point (Step S205). Note that Step S205 is not executed when it is not the timing to generate the check point (Step S204: No), in which case the processing in Step S206 is executed.

At a timing to notify the secondary master node 50 (Step S206: Yes), the inter-center notification unit 17 generates the update file in which the accumulated update log and recovery point log are written in the order each log is generated (Step S207). The inter-center notification unit 17 then transmits the generated update file to the secondary master node 50 (Step S208). Note that the processing returns to Step S201 when it is not the timing to generate the check point (Step S206: No), in which case the processing from Step S201 onward is executed.

Update Processing of Primary Mirror Node 20

Figure 10:
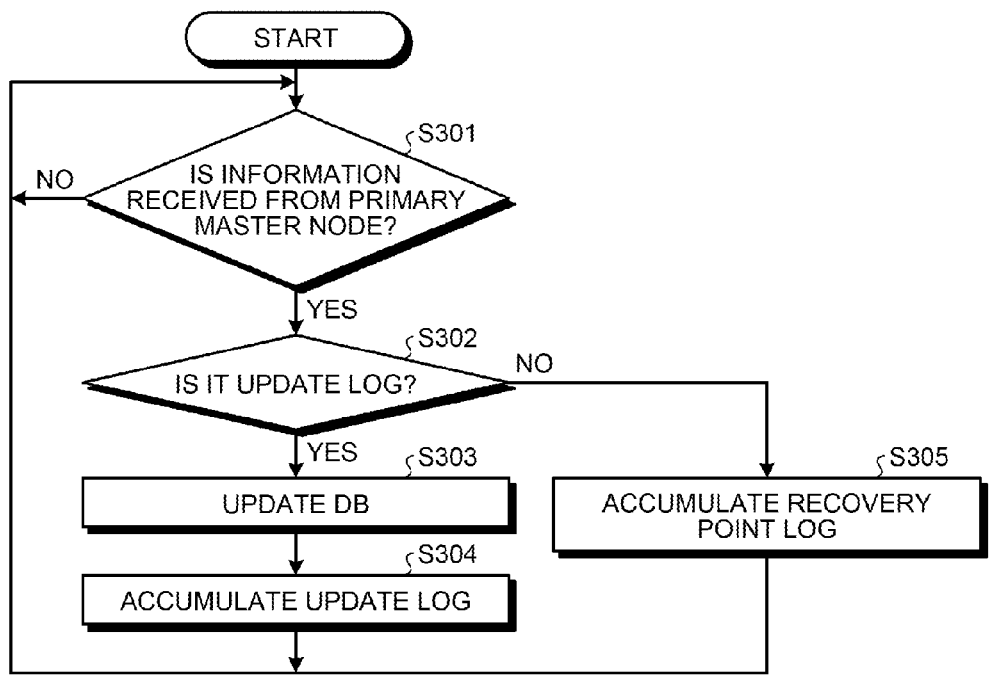
FIG. 10 is a flowchart illustrating the flow of update processing performed by the primary mirror node.

FIG. 10 is a flowchart illustrating the flow of update processing performed by the primary mirror node. Upon receiving information from the primary master node (Step S301: Yes), as illustrated in FIG. 10, the reception unit 24 of the primary mirror node 20 determines whether or not the received information is the update log (Step S302).

Next, the DB update unit 25 updates the DB 22 according to the update log received (Step S303) when the received information is the update log (Step S302: Yes), and accumulates the update log used in the update (Step S304).

When the received information is not the update log but the recovery point log (Step S302: No), on the other hand, the DB update unit 25 accumulates the received recovery point log in a storage unit or the like (Step S305).

Notification Processing of Primary Mirror Node 20

Figure 11:
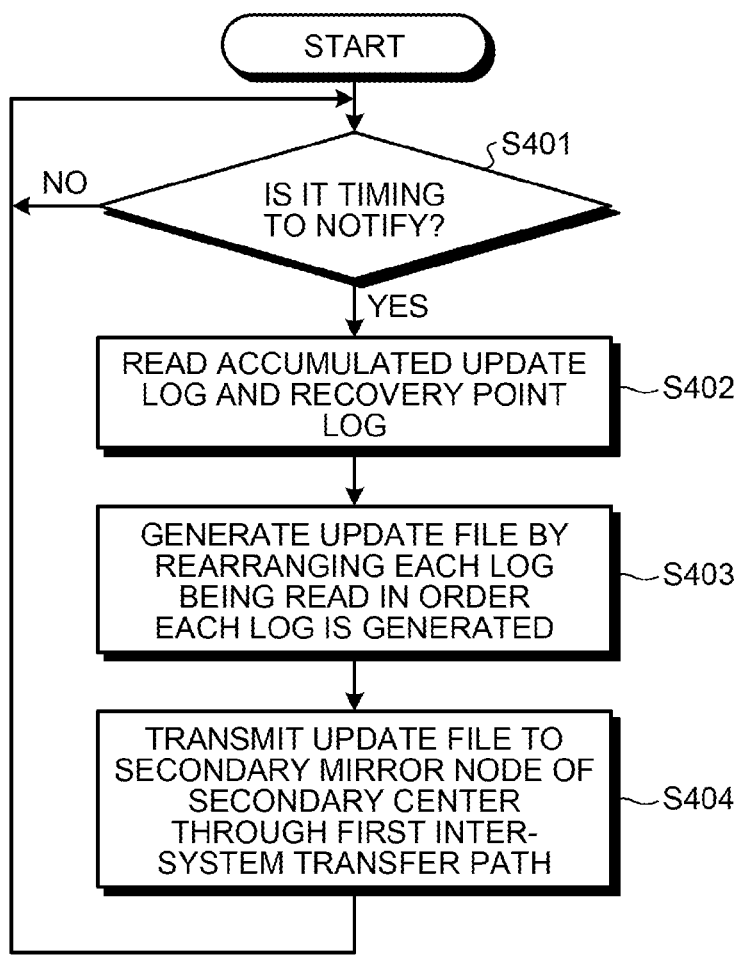
FIG. 11 is a flowchart illustrating the flow of notification processing performed by the primary mirror node.

FIG. 11 is a flowchart illustrating the flow of notification processing performed by the primary mirror node. At a notification timing (Step S401: Yes), the inter-center notification unit 26 of the primary mirror node 20 reads the accumulated update log and recovery point log (Step S402), as illustrated in FIG. 11.

The inter-center notification unit 26 thereafter generates the update file by rearranging each log being read in the order each log is generated (Step S403) and transmits the generated update file to the secondary mirror node 60 in the secondary center 5 by using the first inter-system transfer path (Step S404).

Processing Performed by Secondary Master Node 50

Figure 12:
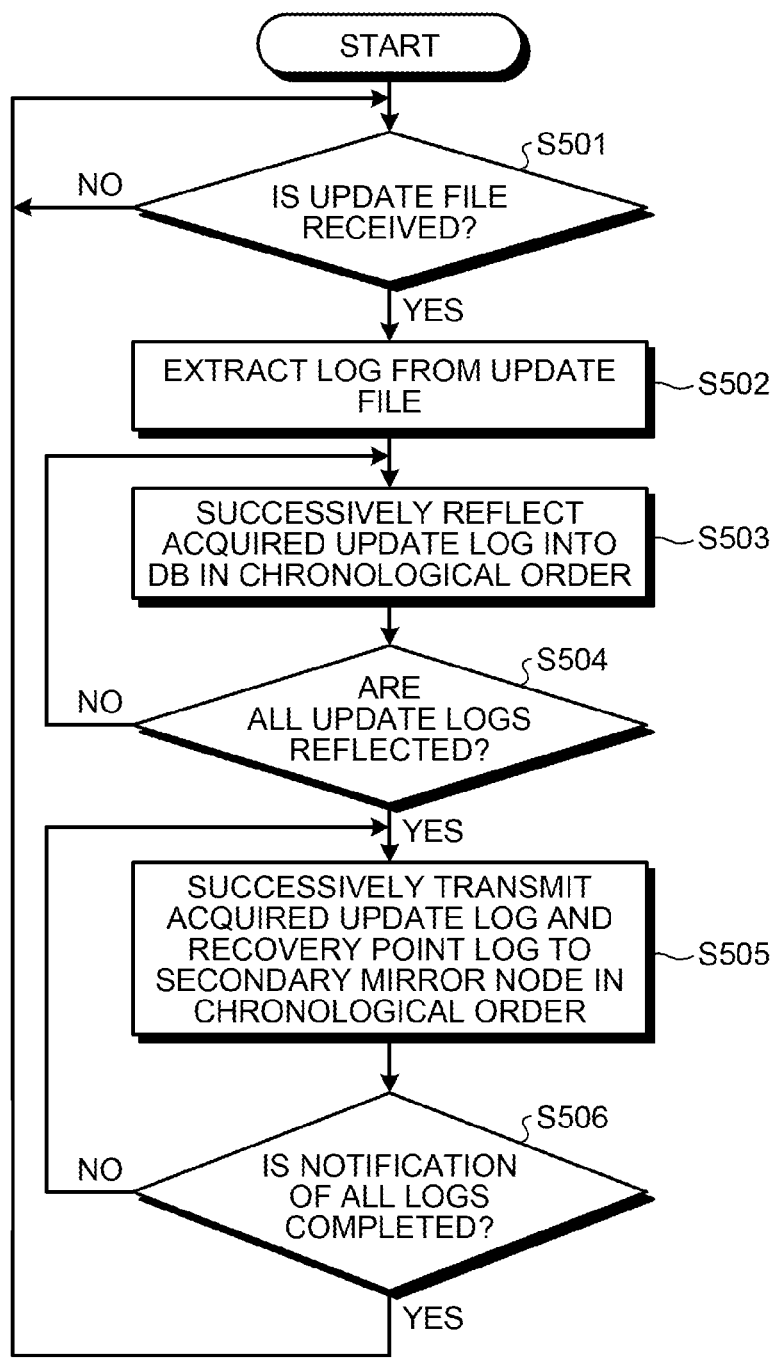
FIG. 12 is a flowchart illustrating the flow of update and notification processing performed by the secondary master node.

FIG. 12 is a flowchart illustrating the flow of update and notification processing performed by the secondary master node. When the update file is received (Step S501: Yes), as illustrated in FIG. 12, the DB update unit 55 of the secondary master node 50 extracts each log included in the update file (Step S502).

Next, the DB update unit 55 successively reflects in the DB 52 the update log, from among the acquired logs, in the chronological order each update log is generated (Step S503) and repeats the processing until all the extracted update logs are reflected (Step S504: No).

When all the extracted update logs are reflected (Step S504: Yes), the intra-center notification unit 56 successively transmits to the secondary mirror node 60 the update log and recovery point log acquired from the update file in the chronological order each log is generated (Step S505). The intra-center notification unit 56 repeats the processing until all the logs acquired from the update file are transmitted (Step S506: No) and, when all the logs are transmitted (Step S506: Yes), the processing from Step S501 onward is repeated by returning thereto.

Processing Performed by Secondary Mirror Node 60

Figure 13:
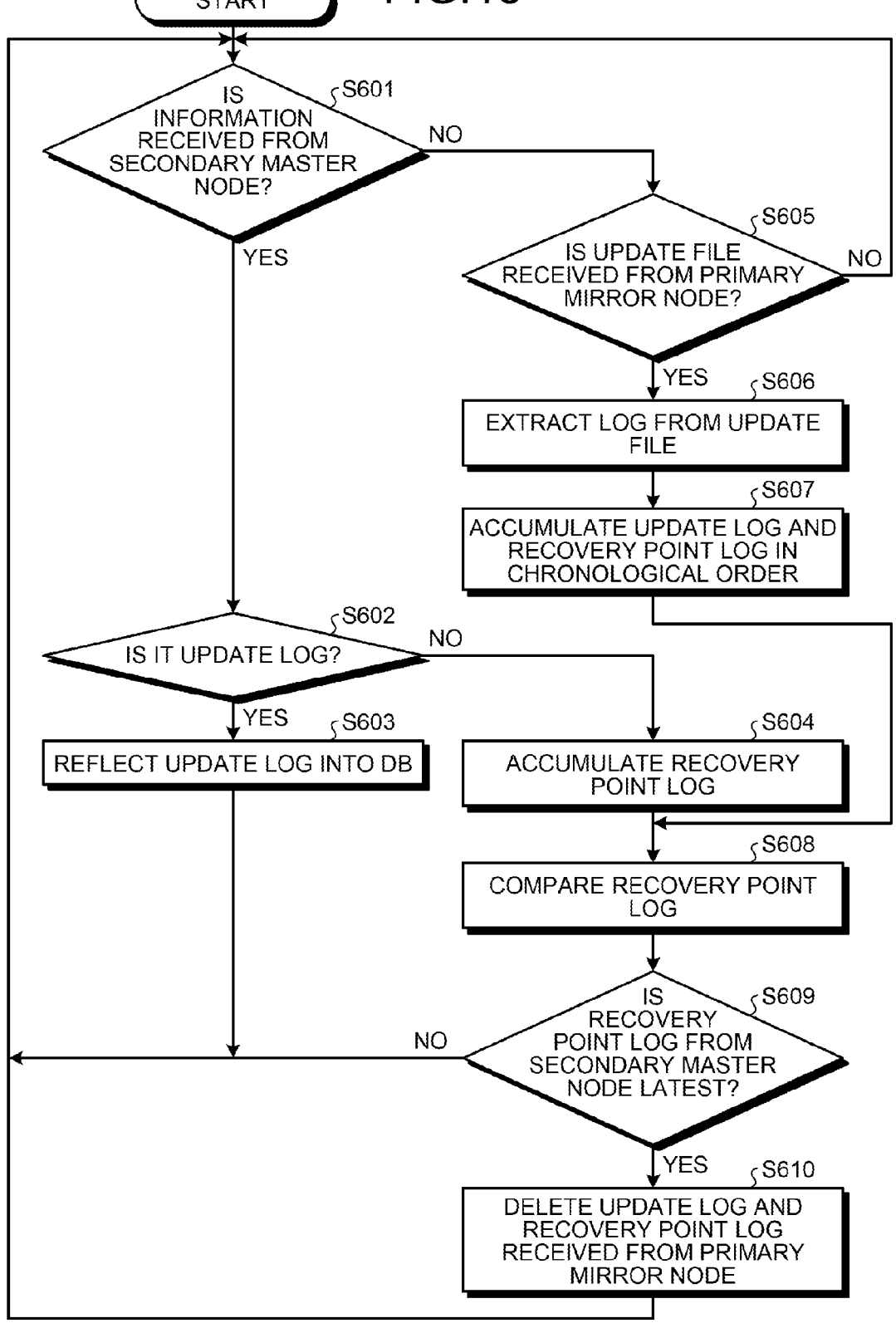
FIG. 13 is a flowchart illustrating the flow of update processing performed by a secondary mirror node.

FIG. 13 is a flowchart illustrating the flow of update processing performed by the secondary mirror node. When the intra-center reception unit 65 receives information from the secondary master node 50 (Step S601: Yes), as illustrated in FIG. 13, the DB update unit 67 of the secondary mirror node 60 determines whether or not the received information is the update log (Step S602).

The DB update unit 67 then reflects the received update log into the DB 62 and updates the DB 62 (Step S603) when the received information is the update log (Step S602: Yes). When the received information is not the update log but the recovery point log (Step S602: No), on the other hand, the DB update unit 67 accumulates the recovery point log in the buffer 63 or the like (Step S604).

Also, when the inter-center reception unit 66 receives the update file not from the secondary master node 50 but the primary mirror node 20 in Step S601 (Step S601: No, Step S605: Yes), the log is extracted from the update file (Step S606). The inter-center reception unit 66 then accumulates the acquired update log and recovery point log into the buffer 63 in the chronological order each log is generated (Step S607).

After that, the DB update unit 67 compares the recovery point logs stored in the buffer 63 at a regular interval (Step S608). The DB update unit 67 executes processing in Step S610 when the recovery point from the secondary master node 50 is the latest (Step S609: Yes). That is, the DB update unit 67 deletes from the buffer 63 the update log and recovery point log received from the primary mirror node 20.

When the recovery point log from the primary mirror node 20 is the latest (Step S609: No), on the other hand, the DB update unit 67 repeats the processing from Step S601 onward while keeping the update log and recovery point log received from the primary mirror node 20 in the buffer 63.

Example of System Switchover Pattern

Figure 14:
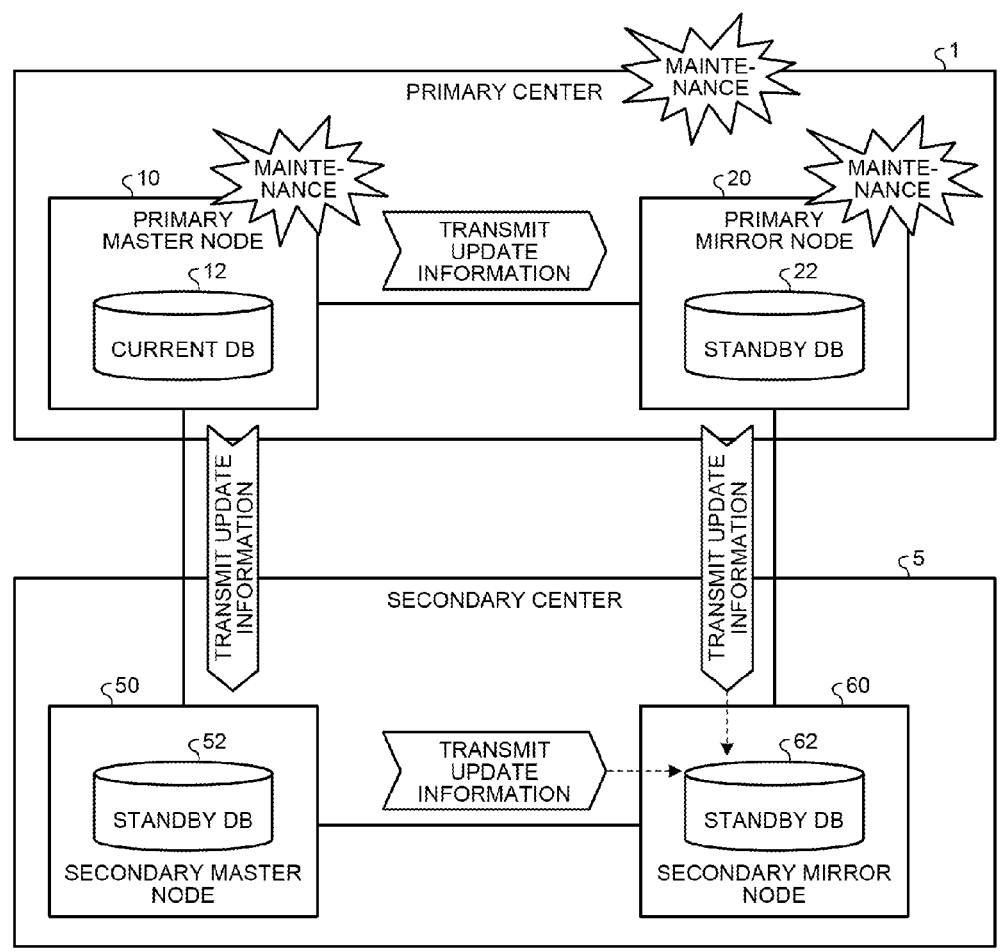
FIG. 14 is a diagram illustrating a first example of system switchover of the redundancy system.
Figure 15:
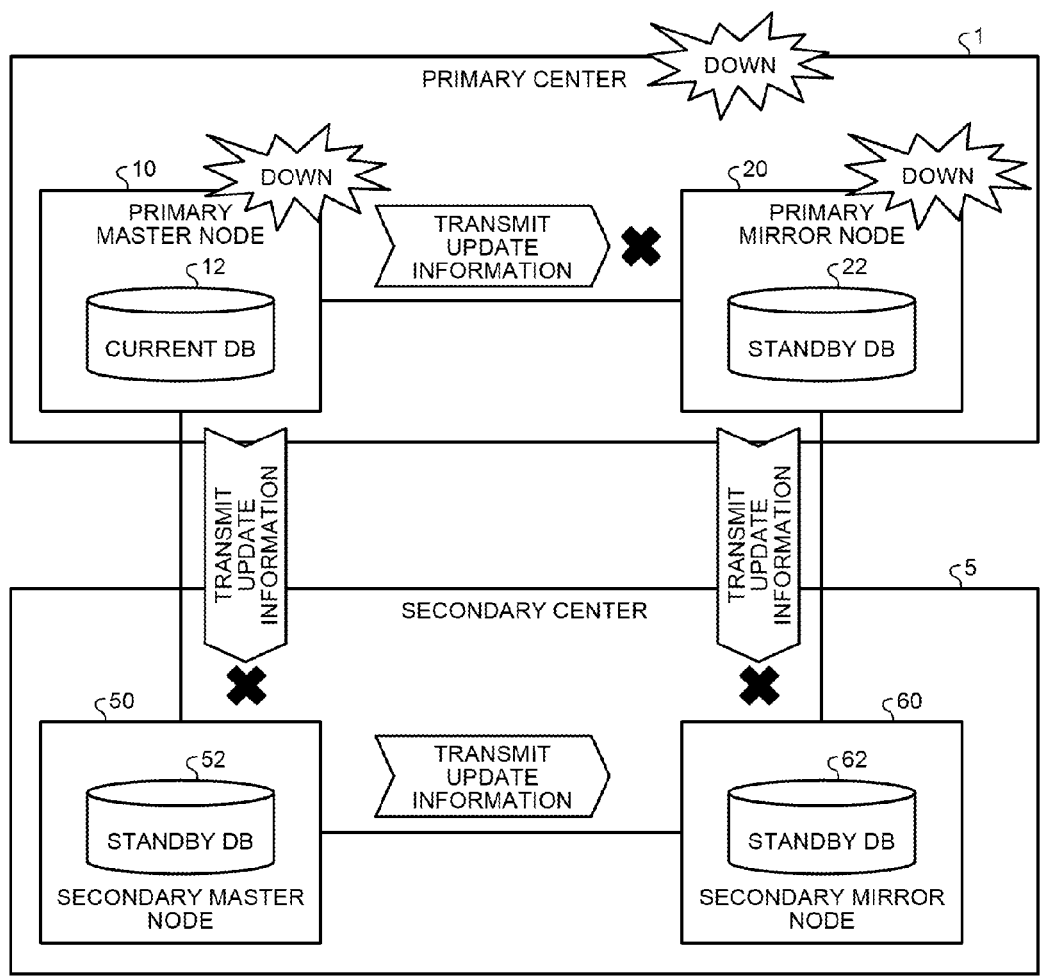
FIG. 15 is a diagram illustrating a second example of the system switchover of the redundancy system.

Next, there will be described a specific example of system switchover performed in the redundancy system illustrated in FIG. 1. FIG. 14 is a diagram illustrating a first example of the system switchover of the redundancy system, and FIG. 15 is a diagram illustrating a second example of the system switchover of the redundancy system.

First Example of System Switchover

FIG. 14 is a diagram illustrating an example of the system switchover performed when the primary master node 10 and the primary mirror node 20 are shut down intentionally in order for the primary center 1 to perform maintenance. Upon receiving an instruction to start the maintenance from a manager or the like, as illustrated in FIG. 14, the primary master node 10 transmits the update information up to the latest one stored in the current DB 12 to the primary mirror node 20 through the first intra-system transfer path and to the secondary master node 50 through the first inter-system transfer path.

The primary master node 10 then shifts to the maintenance mode after completing the transmission of the latest update information of the current DB 12. As a result, the update information the secondary mirror node 60 receives from the primary mirror node 20 through the second inter-system transfer path and the update information the secondary mirror node receives from the secondary master node 50 through the second intra-system transfer path are both the latest update information. The secondary mirror node 60 therefore uses either of the update information received through the two paths and updates the standby DB 62. In this case, the secondary master node 50 is promoted to a primary master node, and the secondary mirror node 60 is promoted to a primary mirror node.

Second Example of System Switchover

FIG. 15 is a diagram illustrating an example of the system switchover performed when the primary master node 10 and the primary mirror node 20 are shut down abruptly due to the system down of the primary center 1. The primary master node 10 is shut down abruptly as illustrated in FIG. 15. In this case, one is difficult to determine the update information up to which point is transmitted to the primary mirror node 20 through the first intra-system transfer path and the update information up to which point is transmitted to the secondary master node 50 through the first inter-system transfer path.

Accordingly, the secondary mirror node 60 identifies the newer piece of update information between the update information received through the two paths, and updates the standby DB 62 by using the identified update information. When the update information from the secondary master node 50 is the latest, the secondary master node 50 is promoted to a primary master node, and the secondary mirror node 60 is promoted to a primary mirror node. When the update information from the primary mirror node 20 is the latest, the secondary master node 50 is demoted to a primary mirror node, and the secondary mirror node 60 is promoted to a primary master node.

Flow Followed by Secondary Mirror Node in System Switchover

Figure 16:
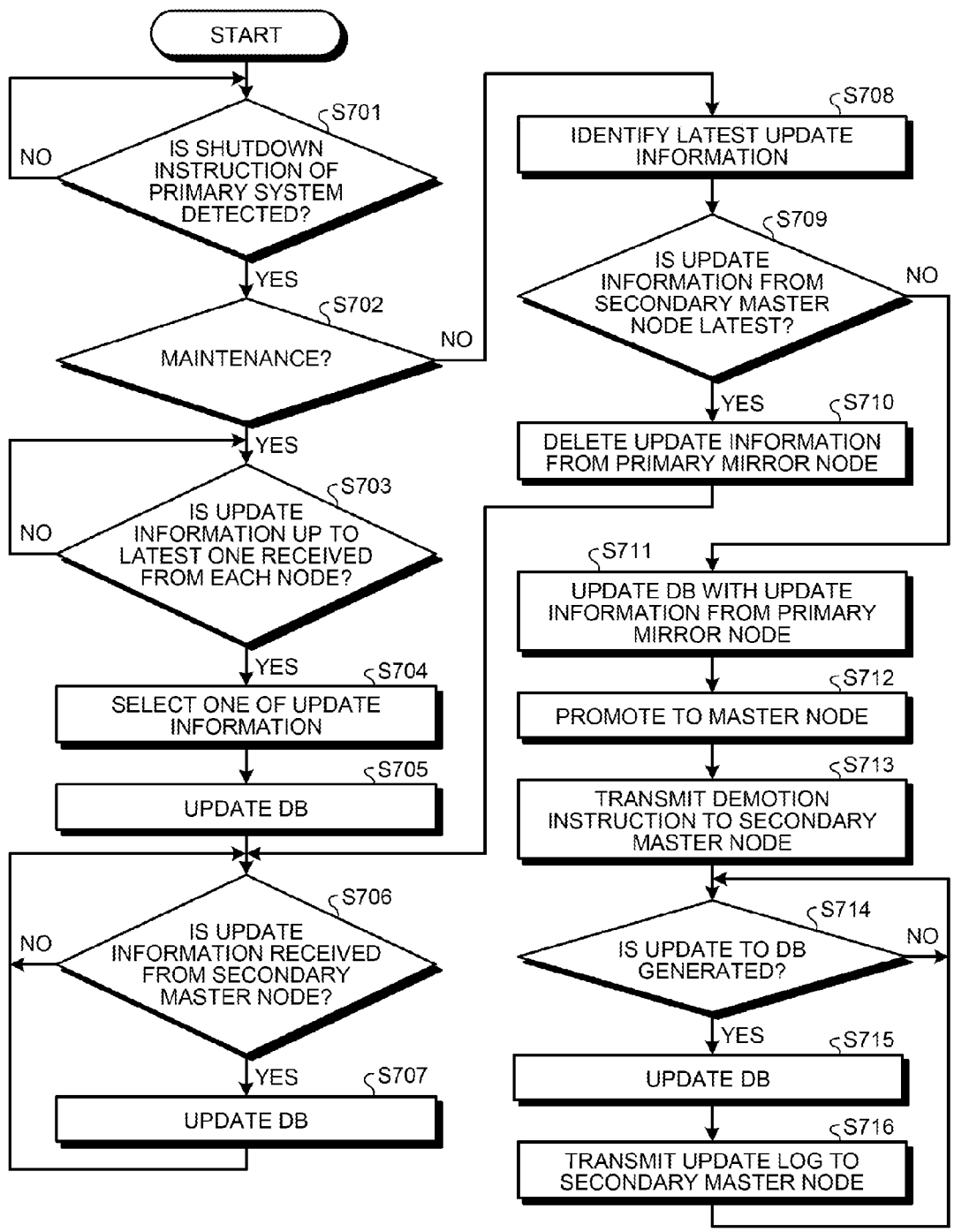
FIG. 16 is a flowchart illustrating the flow of system switchover processing performed by the secondary mirror node.

FIG. 16 is a flowchart illustrating the flow of system switchover processing performed by the secondary mirror node. As illustrated in FIG. 16, the switchover control unit 68 of the secondary mirror node 60 detects a shutdown instruction of the primary center 1 being the primary system (Step S701: Yes) and determines whether or not the reason for the system shutdown is maintenance (Step S702).

When the reason for the system shutdown is the maintenance (Step S702: Yes), the DB update unit 67 determines whether or not the update information up to the latest one is received from each node (Step S703). The switchover control unit 68 waits for a predetermined period of time after receiving the shutdown instruction, for example. Alternatively, the switchover control unit 68 determines that the update information up to the latest one is received when a new piece of update information is not received after receiving the shutdown instruction and waiting for the predetermined period of time.

When the update information up to the latest one is received from each node (Step S703: Yes), the DB update unit 67 selects an arbitrary piece of update information between the update information from the primary mirror node 20 and the update information from the secondary master node 50 (Step S704), and updates the DB 62 (Step S705).

The DB update unit 67 thereafter receives the update information from the secondary master node 50 that is promoted to a master node in the primary system (Step S706: Yes) and updates the DB 62 by using the received update information (Step S707). The processing from Step S706 onward is then repeated.

When the reason for the system shutdown is not the maintenance (Step S702: No), on the other hand, the DB update unit 67 identifies the latest update information between the update information from the primary mirror node 20 and the update information from the secondary master node 50 (Step S708).

When the update information from the secondary master node 50 is the latest (Step S709: Yes), the DB update unit 67 deletes from the buffer 63 the update information transmitted from the primary mirror node 20 (Step S710). The DB update unit 67 thereafter executes the processing from Step S706 onward.

When the update information from the primary mirror node 20 is the latest (Step S709: No), on the other hand, the DB update unit 67 updates the DB 62 by using the update information from the primary mirror node (Step S711).

Successively, the DB update unit 67 promotes the secondary mirror node to a master node in the primary system (Step S712) and transmits a demotion instruction to the secondary master node 50 to be demoted to a mirror node in the primary system (Step S713).

When an update to the DB is generated thereafter (Step S714: Yes), the DB update unit 67 updates the DB 62 (Step S715). Next, the DB update unit 67 extracts a difference in the updated DB 62 before and after the update, generates the update log and transmits it to the secondary master node 50 (Step S716). The processing from Step S714 onward is then repeated.

The primary master node 10 shifts to the maintenance after transmitting all the update information of the current DB 12 when performing the maintenance of the primary system, as described above, so that all the update information the secondary mirror node 60 receives through the two paths is the latest update information. When the primary system is down, on the other hand, the primary master node 10 is shut down without waiting for the update information to be completely transmitted, so that there may be a time lag in the update information received by the secondary mirror node 60 through the two paths.

As a result, a method of selecting the update information can be switched between the time of maintenance and the system down when the system switchover occurs, whereby the switchover can be performed at high speed while preventing the data lost.

Moreover, the system switchover can be executed upon changing the master/mirror relationship between the secondary mirror node 60 and the secondary master node 50 depending on the state of the update information already received by the secondary mirror node 60. As a result, the nodes can be switched over in conjunction with each other such that the latest possible update information is used to continue the operation. Moreover, the reliability of the system is improved since the risk of stopping the operation following the shutdown of the node can be reduced.

The primary master node 10 periodically transmits a check point when transmitting the update information of the DB 12. The secondary mirror node 60 receives the update information and check point through the two paths. Accordingly, the secondary mirror node 60 can update the DB 62 by using the update information received through the path with the newer check point. The secondary mirror node 60 can thus prevent the data lost of the update information used to update the DB 62.

The primary master node 10 updates the DB 12 and then transmits the update log to the primary mirror node 20. As a result, the primary mirror node 20 can synchronize the state of the DB 22 with the DB 12. Moreover, the primary master node 10 periodically transmits, to the secondary master node 50, the update file in which the logs updating the DB 12 are put together. The secondary master node 50 can thus update the DB 52 by decreasing a time lag from the update time of the DB 12.

[b] Second Embodiment

While there has been described the embodiment of the present invention, the present invention may be implemented in various different modes other than the aforementioned embodiment.

Check Point

While there has been described the example where the recovery point log including the serial number unique within the system is used as the check point in the aforementioned embodiment, a recovery point log including a date and time can be used as the check point as well. In other words, various pieces of information can be used as long as a unique order such as an ascending order or a descending order can be specified within the system.

System Shutdown

While there has been described the example where the node is shut down as a result of a failure or the like in the aforementioned embodiment, similar processing can be performed during maintenance work or the like. Moreover, there has been described the example where any of the nodes is shut down in the aforementioned embodiment, but the system shutdown is not limited to what is described above. The switchover processing can be executed in the similar manner when periodic monitoring or a monitoring tool detects that the communication between the nodes is shut down, for example.

The redundancy system can execute the processing similar to that executed at the time of the system down described above even when the communication between the primary center 1 and the secondary center 5 is cut off, for example.

While there has been described the example where the secondary mirror node 60 selects the latest update information between the update information received through the two paths and reflects it to the DB 62 at the time of the system down, it is not limited to such example. The secondary mirror node 60 can execute the system switchover after reflecting each of the update information received through the two paths into the DB 62, for example. Moreover, upon receiving the promotion instruction from the manager terminal or the like, the secondary mirror node 60 reflects to the DB 62 the latest update information, namely the update information indicating a further progressed transaction, between the update information from the primary mirror node 20 and the update information from the secondary master node 50, and then transmits the demotion instruction to the secondary master node 50. The secondary mirror node 60 can also start processing as a primary master node.

System

Moreover, all or a part of the processings described to be performed automatically, among the processings described in the present embodiment, can also be performed manually. On the other hand, all or a part of the processings described to be performed manually can also be performed automatically by using a known method. In addition, the information including the procedure, the control procedure, the specific name and the various data and parameters provided in the description and drawings above can be modified at will unless otherwise specified.

Moreover, each element of each device in the drawings illustrates a functional concept and does not always physically configured as illustrated in the drawings. In other words, a specific mode of distribution or integration of each device is not limited to what is illustrated in the drawings. All or a part of the element can be configured while functionally or physically distributed/integrated by an arbitrary unit according to various loads and a use status. Furthermore, all or an arbitrary part of each processing function performed in each device can be realized by a CPU and a program analyzed/executed by the CPU, or realized as hardware employing wired logic.

Hardware

Figure 17:
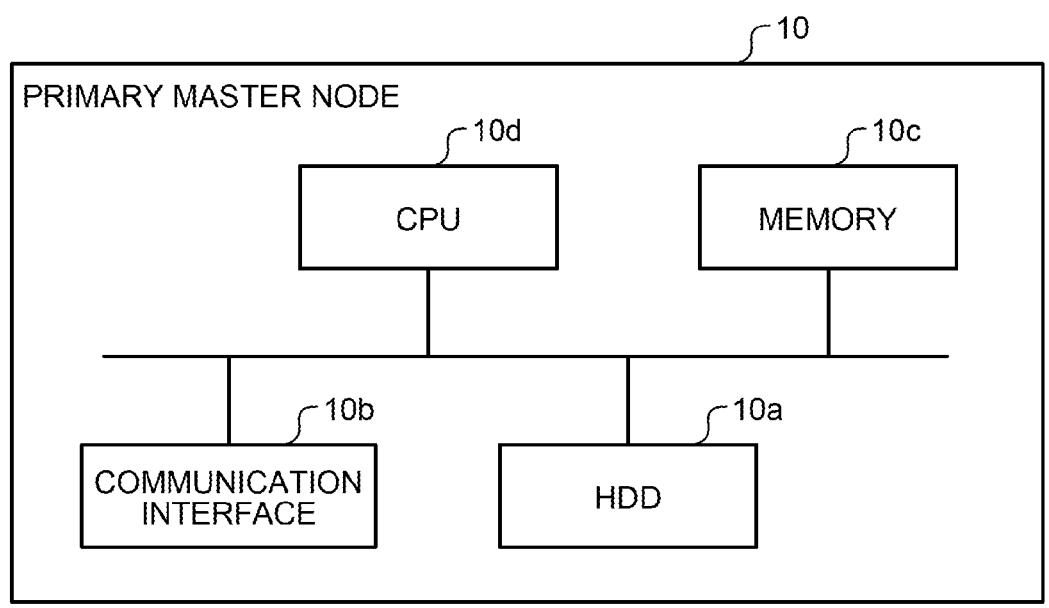
FIG. 17 is a diagram illustrating an example of a hardware configuration.

FIG. 17 is a diagram illustrating an example of a hardware configuration. Each node illustrated in FIG. 1 has a similar hardware configuration so that, in this case, the primary master node 10 is described as an example.

As illustrated in FIG. 17, the primary master node 10 includes an HDD (Hard Disk Drive) 10a, a communication interface 10b, a memory 10c, and a CPU (Central Processing Unit) 10d. Each unit illustrated in FIG. 17 is mutually connected via a bus or the like. Note that the hardware illustrated herein is provided as an example where another hardware such as a graphic interface or a mouse may be included.

The HDD 10a stores a DB and a program that actuates the function illustrated in FIG. 2 and the like. The communication interface 10b is an interface that controls communication with another device and is a network interface card, for example.

The CPU 10d actuates a process executing each function illustrated in FIG. 2 and the like by reading, from the HDD 10a or the like, the program that executes the processing similar to that performed by each processing unit illustrated in FIG. 2 and the like and extracting the program in the memory 10c.

That is, this process executes the function similar to that performed by each processing unit included in the primary master node 10. Specifically, the CPU 10d reads from the HDD 10a or the like the program having a function similar to that of the DB update unit 14, the intra-center notification unit 15, the insertion unit 16, and the inter-center notification unit 17. The CPU 10d then executes the process executing the processing similar to that performed by the DB update unit 14, the intra-center notification unit 15, the insertion unit 16, and the inter-center notification unit 17.

The primary master node 10 as a result operates as an information processor that executes a redundancy creation method by reading and executing the program. Moreover, the primary master node 10 can realize the function similar to that of the aforementioned embodiments by reading the program from a recording medium by a medium reading device and executing the program being read. Note that a program in another embodiment is not always executed by the primary master node 10. The present invention can be similarly applied when the program is executed by another computer or server, or by cooperation between the computer and the server, for example.

According to one aspect, the switchover can be executed while preventing the data lost.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A redundant system comprising:
 a primary system including:
 a first node that extracts data update information indicating a difference before and after an update, and generates an update log in accordance with a data update, the data update information including the update log and a recovery point log indicating a check point which determines an arrival state of the update log; and
 a second node that acquires data update information generated according to a data update performed in the first node through a first intra-system transfer path; and
 a secondary system including:
 a third node that acquires data update information generated according to a data update performed in the first node through a first inter-system transfer path set between the first node and the third node; and
 a fourth node that includes a database and a buffer, and, in normal operation, stores in the buffer the data update information acquired by the second node through a second inter-system transfer path set between the second node and the fourth node, and stores in the database the data update information acquired by the third node through a second intra-system transfer path,
 wherein, the fourth node includes:
 a processor that executes a process including:
 when the secondary system takes over the primary system, executing first takeover processing or second takeover processing, the first takeover processing taking over the primary system on the basis of the data update information acquired from either the second inter-system transfer path and stored in the buffer or acquired from the second intra-system transfer path and stored in the database, and the second takeover processing taking over the primary system on the basis of a latest one of the data update information acquired from the second inter-system transfer path and stored in the buffer and the data update information acquired from the second intra-system transfer path and stored in the database.

2. The redundant system according to claim 1, wherein the second takeover processing compares the data update information acquired from the second inter-system transfer path and the data update information acquired from the second intra-system transfer path, and takes over the primary system on the basis of one of the update information including update information indicating a further progressed transaction.

3. The redundant system according to claim 1, wherein the first takeover processing does not switch master/mirror relationship between the third node and the fourth node, while the second takeover processing switches the master/mirror relationship between the third node and the fourth node.

4. The redundant system according to claim 1, wherein the first takeover processing is takeover processing associated with maintenance of the primary system, and the second takeover processing is takeover processing associated with abnormal shutdown of the primary system.

5. The redundant system according to claim 1, wherein the second takeover processing promotes the secondary system to the primary system in response to completion of reflection of the acquired data update information to storage data in the fourth node.

6. A method for a redundant system including a primary system and a secondary system, the method comprising:
- transmitting data update information generated according to a data update performed in a first node in the primary system, from the first node to a second node in the primary system, through a first intra-system transfer path;
- wherein the data update information indicating a difference before and after an update, and generates an update log in accordance with a data update, the data update information including the update log and a recovery point log indicating a check point which determines an arrival state of the update log;
- transmitting data update information generated according to a data update performed in the first node, from the first node to a third node in the secondary system, through a first inter-system transfer path set between the first node and the third node;
- transmitting the data update information acquired by the second node, from the second node to a fourth node in the secondary system, through a second inter-system transfer path set between the second node and the fourth node, the fourth node including a database and buffer and storing the data update information transmitted from the second node through the second inter-system transfer path in the buffer in normal operation;
- transmitting the data update information acquired by the third node, from the third node to the fourth node, through a second intra-system transfer path, the fourth node, in the normal operation, storing the data update information transmitted from the third node through the second intra-system transfer path in the database; and
- when the secondary system takes over the primary system, executing, by the fourth node, first takeover processing or second takeover processing, the first takeover processing taking over the primary system on the basis of the data update information acquired from wither the second inter-system transfer path and stored in the buffer or acquired from the second intra-system transfer path and stored in the database, and the second takeover processing taking over the primary system on the basis of a latest one of the data update information acquired from the second inter-system transfer path and stored in the buffer and the data update information acquired from the second intra-system transfer path and stored in the database.

* * * * *